US009254442B2

(12) United States Patent
Arakawa et al.

(10) Patent No.: US 9,254,442 B2

(45) Date of Patent: Feb. 9, 2016

(54) VIDEO GAME APPARATUS, VIDEO GAME PROCESSING PROGRAM, PROGRAM RECORDING MEDIUM, AND VIDEO GAME PROCESSING METHOD

(75) Inventors: Takeshi Arakawa, Tokyo (JP); Tatsuya Kando, Tokyo (JP); Tomohiro Hasegawa, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 2250 days.

(21) Appl. No.: 12/113,446

(22) Filed: May 1, 2008

(65) Prior Publication Data

US 2008/0293466 A1 Nov. 27, 2008

(30) Foreign Application Priority Data

May 25, 2007 (JP) ................................ P2007-138985

(51) Int. Cl.

*A63F 13/00* (2014.01)
*A63F 13/58* (2014.01)
*A63F 13/45* (2014.01)
*A63F 13/55* (2014.01)
*A63F 13/40* (2014.01)

(52) U.S. Cl.

CPC ................. *A63F 13/58* (2014.09); *A63F 13/10* (2013.01); *A63F 13/45* (2014.09); *A63F 13/55* (2014.09); *A63F 2300/575* (2013.01); *A63F 2300/609* (2013.01); *A63F 2300/807* (2013.01)

(58) Field of Classification Search

CPC .......... A63F 13/45; A63F 13/55; A63F 13/58
USPC .............................................................. 463/7
See application file for complete search history.

(56) References Cited

U.S. PATENT DOCUMENTS

2003/0098864 A1 5/2003 Ohno
2004/0077394 A1 4/2004 Matsuno et al.
2004/0204237 A1 10/2004 Miyagawa et al.
2005/0153766 A1* 7/2005 Harmon ............................ 463/9
2007/0149266 A1 6/2007 Arakawa et al.
2007/0200855 A1 8/2007 Minagawa
2008/0039167 A1* 2/2008 Harris et al. ...................... 463/8

FOREIGN PATENT DOCUMENTS

JP 2002-239217 8/2002

OTHER PUBLICATIONS

English language Abstract of JP 2002-239217.

* cited by examiner

*Primary Examiner* — Milap Shah
*Assistant Examiner* — Thomas H Henry
(74) *Attorney, Agent, or Firm* — Greenblum & Bernstein, P.L.C.

(57) ABSTRACT

In a video game that progresses a game using a limited number of items, the game can be made more interesting. In an area data table 126-1 of a first area, a brand 'CAT' having a previous brand point '14%' is 'BEST 1', and a brand 'BOAR' having a previous brand point '13%' is 'BEST 2'. In addition, a brand 'TIGER' having a previous brand point '3%' is 'WORST 2', and a brand 'RAT' having a previous brand point '2%' is 'WORST 1'. Accordingly, if a player character executes a battle against an enemy character in the first area, when an item of the brand 'CAT', which is 'BEST 1', is used, its power becomes three times higher than a reference power, and when an item of the brand 'BOAR', which is 'BEST 2', is used, its power becomes one and half times higher than the reference power. In addition, when an item of the brand 'TIGER', which is 'WORST 2', is used, its power becomes 0.5 times lower than the reference power, and an item of the brand 'RAT', which is 'WORST 1', becomes unavailable.

13 Claims, 16 Drawing Sheets

129

| RANKING | MAGNIFICATION TO PRICE |
|---|---|
| FIRST | 5.0 TIMES |
| SECOND | 2.0 TIMES |
| THIRD | 1.5 TIMES |
| FOURTH | 1.0 TIMES |
| FIFTH | 1.0 TIMES |
| SIXTH | 1.0 TIMES |
| SEVENTH | 1.0 TIMES |
| EIGHTH | 1.0 TIMES |
| NINTH | 1.0 TIMES |
| TENTH | 1.0 TIMES |
| ELEVENTH | 0.75 TIMES |
| TWELFTH | 0.5 TIMES |
| THIRTEENTH | 0.25 TIMES |

| ID | ITEM NAME | CATEGORY | BRAND | PRICE | POWER (OFFENSIVE POWER/RECOVERY POWER) | ... |
|---|---|---|---|---|---|---|
| 0001 | FIRE (lev.1) | ATTACK | RAT | 100 | 50 | ... |
| 0002 | FIRE (lev.2) | ATTACK | RAT | 120 | 100 | ... |
| 0003 | FIRE (lev.3) | ATTACK | RAT | 200 | 200 | ... |
| 0004 | FIREBALL (lev.1) | ATTACK | OX | 100 | 150 | ... |
| 0005 | FIREBALL (lev.2) | ATTACK | OX | 150 | 200 | ... |
| 0006 | FIREBALL (lev.3) | ATTACK | OX | 230 | 400 | ... |
| 0007 | RECOVERY DRINK | RECOVERY | TIGER | 50 | 20 | ... |
| 0008 | RECOVERY DRINK | RECOVERY | RABBIT | 60 | 20 | ... |
| 0009 | ELECTRIC SHOCK | ATTACK | RAT | 100 | 100 | ... |
| 0010 | ELECTRIC SHOCK | ATTACK | RAT | 200 | 200 | ... |
| 0011 | BLIZZARD (lev.1) | ATTACK | RABBIT | 150 | 150 | ... |
| 0012 | BLIZZARD (lev.2) | ATTACK | RABBIT | 250 | 300 | ... |
| ... | ... | ... | ... | ... | ... | ... |

| ACQUIRED ITEM | 0001, 0004, 0040, 0015, .... | | |
|---|---|---|---|
| HELD ITEM | 0001, 0010, .... | | |
| USED ITEM | 0001 | 0010 | .... |
| | ONCE | TWICE | .... |
| POSSESSION MONEY | 1000 | | |

| ADDITION VALUE CORRECTION COEFFICIENT |
| --- |
| VARIABLE VALUE CORRECTION COEFFICIENT. IF IT IS PRESENT, RANKING EASILY VARIES. |
| 0.60 |

| BRAND | PREVIOUS BRAND POINT | VARIABLE VALUE | CORRECTED VARIABLE VALUE | BRAND POINT IMMEDIATELY AFTER VARIATION | NEW BRAND POINT |
| --- | --- | --- | --- | --- | --- |
| | BRAND POINT = MARKET PENETRATION FACTOR. RANKING IS GENERATED WITH THIS VALUE. | VARIABLE VALUE OF BRAND POINT. IT IS ADDED TO BRAND POINT WHEN BATTLE RESULT IS OBTAINED. | VARIABLE VALUE IS CORRECTED FOR EASE OF BALANCE ADJUSTMENT. | IT IS CORRECTED WITH VARIABLE VALUE. | VARIED BRAND POINT IS ROUNDED OFF TO 100%. |
| RAT | 2.00% | 10.00 | 5.00 | 7.00% | 4.44% |
| OX | 4.00% | 8.00 | 4.00 | 8.00% | 5.08% |
| TIGER | 3.00% | 10.00 | 5.00 | 8.00% | 5.08% |
| RABBIT | 4.00% | 20.00 | 10.00 | 14.00% | 8.89% |
| DRAGON | 5.00% | 0.00 | 0.00 | 6.00% | 3.81% |
| SNAKE | 7.00% | 0.00 | 0.00 | 7.00% | 4.44% |
| HORSE | 7.00% | 1.00 | 0.50 | 7.50% | 4.76% |
| SHEEP | 8.00% | 50.00 | 25.00 | 33.00% | 20.95% |
| MONKEY | 9.00% | 3.00 | 1.50 | 10.50% | 6.67% |
| ROOSTER | 11.00% | 3.00 | 1.50 | 12.50% | 7.94% |
| DOG | 12.00% | 4.00 | 2.00 | 14.00% | 8.89% |
| BOAR | 13.00% | 5.00 | 2.50 | 16.50% | 9.84% |
| CAT | 14.00% | 1.00 | 0.50 | 14.50% | 9.21% |
| | 100.00% | | | 157.50% | 100.00% |

| | |
|---|---|
| BEST 1 | POWER (OFFENSIVE POWER/RECOVERY POWER) THREE TIMES |
| BEST 2 | POWER (OFFENSIVE POWER/RECOVERY POWER) ONE AND HALF TIMES |
| WORST 1 | POWER (OFFENSIVE POWER/RECOVERY POWER) HALF TIMES |
| WORST 2 | BADGE UNAVAILABLE |

FIG. 8

→ BRAND
↓ AREA

128

| | RAT | OX | TIGER | RABBIT | DRAGON | SNAKE | HORSE | SHEEP | MONKEY | ROOSTER | DOG | BOAR | CAT | | DOMINANT BRAND |
|---|---|---|---|---|---|---|---|---|---|---|---|---|---|---|---|
| ce001 | 41 | 75 | 7 | 49 | 97 | 44 | 96 | 90 | 82 | 15 | 31 | 11 | 46 | 684 | NO DOMINANT BRAND |
| ce002 | 21 | 36 | 82 | 65 | 41 | 82 | 14 | 45 | 13 | 57 | 368 | 62 | 5 | 891 | 11 |
| ce003 | 18 | 20 | 69 | 72 | 55 | 64 | 0 | 58 | 87 | 97 | 33 | 44 | 65 | 682 | NO DOMINANT BRAND |
| ce004 | 61 | 28 | 35 | 57 | 78 | 57 | 48 | 3 | 8 | 43 | 50 | 63 | 53 | 584 | NO DOMINANT BRAND |
| no001 | 66 | 3 | 96 | 46 | 3 | 64 | 22 | 307 | 2 | 59 | 13 | 71 | 87 | 839 | 8 |
| no002 | 80 | 9 | 11 | 7 | 8 | 85 | 17 | 31 | 25 | 54 | 86 | 88 | 78 | 579 | NO DOMINANT BRAND |
| no003 | 51 | 74 | 93 | 27 | 58 | 59 | 85 | 28 | 41 | 23 | 71 | 85 | 33 | 728 | NO DOMINANT BRAND |
| no004 | 66 | 89 | 99 | 15 | 45 | 41 | 1 | 35 | 347 | 99 | 58 | 8 | 97 | 1000 | 9 |
| no005 | 0 | 7 | 74 | 23 | 39 | 11 | 40 | 24 | 11 | 20 | 29 | 81 | 4 | 363 | NO DOMINANT BRAND |
| no006 | 29 | 51 | 48 | 9 | 25 | 50 | 60 | 69 | 42 | 4 | 17 | 62 | 7 | 486 | NO DOMINANT BRAND |
| no007 | 84 | 99 | 52 | 9 | 34 | 15 | 33 | 11 | 96 | 21 | 68 | 66 | 50 | 638 | NO DOMINANT BRAND |
| no008 | 11 | 77 | 13 | 49 | 301 | 98 | 28 | 100 | 97 | 4 | 38 | 14 | 89 | 919 | NO DOMINANT BRAND |
| no009 | 67 | 38 | 79 | 41 | 29 | 91 | 51 | 16 | 81 | 30 | 75 | 23 | 16 | 637 | NO DOMINANT BRAND |
| no010 | 50 | 36 | 34 | 32 | 62 | 5 | 11 | 93 | 15 | 16 | 37 | 21 | 14 | 426 | NO DOMINANT BRAND |
| ca001 | 21 | 54 | 31 | 67 | 99 | 50 | 7 | 62 | 53 | 18 | 12 | 67 | 76 | 617 | NO DOMINANT BRAND |
| ca002 | 18 | 41 | 21 | 61 | 1 | 80 | 98 | 49 | 29 | 35 | 43 | 41 | 96 | 613 | NO DOMINANT BRAND |
| ca003 | 80 | 10 | 30 | 10 | 65 | 38 | 17 | 26 | 69 | 35 | 92 | 48 | 6 | 526 | NO DOMINANT BRAND |
| so001 | 100 | 377 | 85 | 38 | 32 | 13 | 24 | 88 | 6 | 64 | 87 | 51 | 12 | 977 | 2 |
| so002 | 34 | 86 | 9 | 38 | 36 | 58 | 78 | 78 | 9 | 99 | 76 | 56 | 83 | 740 | NO DOMINANT BRAND |
| we001 | 91 | 7 | 75 | 341 | 46 | 84 | 41 | 64 | 37 | 4 | 61 | 41 | 17 | 909 | 4 |
| we002 | 74 | 72 | 91 | 88 | 51 | 3 | 46 | 29 | 49 | 60 | 95 | 97 | 90 | 845 | NO DOMINANT BRAND |
| we003 | 23 | 78 | 48 | 26 | 73 | 79 | 59 | 86 | 63 | 54 | 28 | 81 | 4 | 702 | NO DOMINANT BRAND |
| we004 | 55 | 67 | 70 | 41 | 32 | 10 | 17 | 1 | 30 | 20 | 65 | 67 | 60 | | |
| | 1141 | 1404 | 1253 | 1211 | 1310 | 1181 | 943 | 1395 | 1367 | 936 | 1653 | 1248 | 1064 | | |

| RANKING | MAGNIFICATION TO PRICE |
|---|---|
| FIRST | 5.0 TIMES |
| SECOND | 2.0 TIMES |
| THIRD | 1.5 TIMES |
| FOURTH | 1.0 TIMES |
| FIFTH | 1.0 TIMES |
| SIXTH | 1.0 TIMES |
| SEVENTH | 1.0 TIMES |
| EIGHTH | 1.0 TIMES |
| NINTH | 1.0 TIMES |
| TENTH | 1.0 TIMES |
| ELEVENTH | 0.75 TIMES |
| TWELFTH | 0.5 TIMES |
| THIRTEENTH | 0.25 TIMES |

| WEEK | ACTUAL TIME | BOOM | SLUMP |
|---|---|---|---|
| ACTUAL TIME FIRST WEEK | 0 O'CLOCK | RAT | – |
| | 1 O'CLOCK | – | SHEEP |
| | 2 O'CLOCK | OX | – |
| | 3 O'CLOCK | – | MONKEY |
| | 4 O'CLOCK | TIGER | – |
| | 5 O'CLOCK | – | ROOSTER |
| | 6 O'CLOCK | RABBIT | – |
| | 7 O'CLOCK | – | DOG |
| | 8 O'CLOCK | DRAGON | – |
| | 9 O'CLOCK | – | BOAR |
| | 10 O'CLOCK | SNAKE | – |
| | 11 O'CLOCK | – | RAT |
| | 12 O'CLOCK | HORSE | – |
| | 13 O'CLOCK | – | OX |
| | 14 O'CLOCK | SHEEP | – |
| | 15 O'CLOCK | – | TIGER |
| | 16 O'CLOCK | MONKEY | – |
| | 17 O'CLOCK | – | RABBIT |
| | 18 O'CLOCK | ROOSTER | – |
| | 19 O'CLOCK | – | DRAGON |
| | 20 O'CLOCK | DOG | – |
| | 21 O'CLOCK | – | SNAKE |
| | 22 O'CLOCK | BOAR | – |
| | 23 O'CLOCK | – | HORSE |
| ACTUAL TIME SECOND WEEK | 0 O'CLOCK | CAT | – |
| | 1 O'CLOCK | – | HORSE |
| | 2 O'CLOCK | RAT | – |
| | 3 O'CLOCK | – | SHEEP |
| | 4 O'CLOCK | OX | – |
| | 5 O'CLOCK | – | MONKEY |
| | 6 O'CLOCK | TIGER | – |
| | 7 O'CLOCK | – | ROOSTER |
| | 8 O'CLOCK | RABBIT | – |
| | 9 O'CLOCK | – | DOG |
| | 10 O'CLOCK | DRAGON | – |
| | 11 O'CLOCK | – | CAT |
| | 12 O'CLOCK | SNAKE | – |
| | 13 O'CLOCK | – | RAT |
| | 14 O'CLOCK | HORSE | – |
| | 15 O'CLOCK | – | OX |
| | 16 O'CLOCK | SHEEP | – |
| | 17 O'CLOCK | – | TIGER |
| | 18 O'CLOCK | MONKEY | – |
| | 19 O'CLOCK | – | RABBIT |
| | 20 O'CLOCK | ROOSTER | – |
| | 21 O'CLOCK | – | DRAGON |
| | 22 O'CLOCK | DOG | – |
| | 23 O'CLOCK | – | SNAKE |
| ACTUAL TIME THIRD WEEK | 0 O'CLOCK | DOG | – |
| | 1 O'CLOCK | – | SNAKE |
| | 2 O'CLOCK | CAT | – |

· TREND MAP IS FIRST CONFIRMED

· WHEN PLAYING GAME UNSOLICITOUSLY ...

· WHEN DYED BY TREND ...

· WHEN TREND IS DYED ...

VIDEO GAME APPARATUS, VIDEO GAME PROCESSING PROGRAM, PROGRAM RECORDING MEDIUM, AND VIDEO GAME PROCESSING METHOD

CROSS REFERENCE TO RELATED APPLICATION

The present disclosure relates to subject matter contained in Japanese Patent Application No. 2007-138985, filed on May 25, 2007, the disclosure of which is expressly incorporated herein by reference in its entirety.

BACKGROUND OF THE INVENTION

1. Field of the Invention

The present invention relates to a video game apparatus, a video game processing program, a program recording medium, and a video game processing method, which progress a game by executing a virtual battle between a player character and an enemy character according to an operation input.

2. Description of the Related Art

Generally, there is known a role playing game (RPG), in which a player selects one of a plurality of items, and plays a role of a player character with the selected item to execute a virtual battle against an enemy character (for example, see JP-A-2002-239217). In the RPG, a power value or a maximum power value during the battle against the enemy character is predefined for each item. The items are bought or sold through virtual shops in the world of the game, and then the player acquires a new item or sells an unnecessary item. The player plays a role of a player character to use an appropriate item according to a battle scene. Finally, if the player reaches a boss character, the corresponding stage is cleared.

However, the kinds or the number of usable items on the game is naturally limited. Accordingly, when a fixed power value or a price is defined for each item, even if a plurality of items are used, a battle pattern against an enemy character when a player character uses the items becomes monotonous. In addition, the items are bought or sold anytime without gain or loss. For this reason, as the game progresses, the player cannot get stimulation from the battle or game development, which causes the player to lose interest in the game.

SUMMARY OF THE INVENTION

The invention has been finalized in consideration of the drawbacks inherent in the related art. It is an object of the invention to provide a video game apparatus, a video game processing program, a program recording medium, and a video game processing method, which can cause a player to play a game with great interest in a video game, in which a game progresses with a limited number of items.

According to a first aspect of the invention, there is provided a video game apparatus, which uses a plurality of items, the power value of each of which has a more advantageous effect the greater it is, and executes a virtual battle between a player character and an enemy character according to an operation input while allowing the player character to use one of the items. The video game apparatus includes: a point management unit that stores a plurality of attributes, which are correspondingly assigned to the items, converts the utilization of the corresponding item by the player character into a point, and stores the converted point for each attribute; a ranking determination unit that determines the ranking of each attribute according to the number of the point stored in the point management unit; and a power value control unit that changes the power value of an item corresponding to each attribute according to the ranking of the attribute determined by the ranking determination unit.

With this configuration, if the player character uses an item, the utilization of that item is converted into a point and stored for each attribute of the item, and the power value of an item corresponding to each attribute changes according to the number of the stored point. Accordingly, even if the player character uses the same item, the power value of that item varies. Therefore, when a virtual battle against an enemy character is executed, a battle based on different ability values can be developed.

According to a second aspect of the invention, the utilization of the corresponding item by the player character may include an item equipment state of the player character and a frequency when the player character uses an item in the virtual battle against the enemy character.

With this configuration, the power value of an item changes according to an item held by the player character and the attribute of an item used in the battle. Therefore, the attribute of a held item, as well as a used item, can be reflected in the power value, and thus a player's intention can be strongly reflected in the power value.

According to a third aspect of the invention, the point management unit may store the point for each attribute by a percentage with respect to all of the attributes, and the ranking determination unit may determine the ranking of the attribute on the basis of the percentage of the point.

With this configuration, the power value of the item changes according to a percentage of an item use frequency of the corresponding attribute with respect to the use frequency of all of the attributes.

According to a fourth aspect of the invention, the point management unit may include a correction coefficient generation unit that generates a correction coefficient, and a correction unit that corrects a point to be added to the corresponding attribute on the basis of the correction coefficient generated by the correction coefficient generation unit.

With this configuration, a difference in variable value, which is the point to be added to the corresponding attribute, is corrected, and balance adjustment is achieved.

According to a fifth aspect of the invention, the virtual battle between the player character and the enemy character may be executed in an individual game space selected from a plurality of game spaces, including a plurality of stages or areas. In this case, the point management unit may include a first point management unit that, for each individual game space, converts the utilization of the corresponding item by the player character into a point, and stores the converted point for each attribute, and a second point management unit that stores the point of all of the game spaces for each attribute by totalizing the point of each individual game space to be managed by the first point management unit for each attribute. The ranking determination unit may determine the ranking of the attribute according to the number of the point stored in the first or second point management unit.

With this configuration, the first point management unit stores the point for each attribute in each individual game space, and the second point management unit stores the point for each attribute in all of the individual game spaces. Therefore, the attribute of an item used by the player character in an individual game space is reflected in the ranking based on the point stored in the first point management unit, and the attribute of an item used by the player character in the entire game is reflected in the ranking based on the point stored in the second point management unit.

According to a sixth aspect of the invention, the correction coefficient generation unit may randomly change the correction coefficient.

With this configuration, since a random correction coefficient is used, a gap in variable value according to the point is corrected, and balance adjustment is achieved.

According to a seventh aspect of the invention, each of the items may be assigned with a price to be used at the time of a virtual transaction on the game. In this case, the video game apparatus may further include a price value control unit that changes the price value of an item of each attribute according to the ranking of the attribute determined by the ranking determination unit.

With this configuration, even if the same item is used, since the price value of the corresponding item varies, the player can advantageously sell and buy the item at the time of an item transaction. Therefore, the game can be made more interesting due to the item transaction.

According to an eighth aspect of the invention, the utilization of the corresponding item by the player character may further include a virtual transaction frequency of the corresponding item on the game.

With this configuration, the power value of the item changes according to the attribute of a bought or sold item, as well as an item held by the player character and an item used in the battle. Therefore, a player's intention can be strongly reflected in an ability value.

According to a ninth aspect of the invention, the video game apparatus may further include a background drawing unit that draws a background on a screen on which the player character is present. In this case, the background drawing unit may change the background according to the ranking of the attribute determined by the ranking determination unit.

With this configuration, the background on which the player character appears changes according to the ranking of the attribute, thereby making the game more interesting.

According to a tenth aspect of the invention, at least a pair among the plurality of attributes may be in an opposite relationship. In this case, the video game apparatus may further include a point correction unit that corrects the point of one of the attributes in the opposite relationship by a correction value higher than the point of the other attribute.

With this configuration, a difference in the point of the attributes in the opposite relationship is increased, thereby making the point change unpredictable.

According to an eleventh aspect of the invention, the video game apparatus may further include a transmitting/receiving unit that transmits the point of each attribute stored in the point management unit to the outside, and simultaneously receives a point of each attribute from the outside. In this case, the point management unit may include a point changing unit that changes the point of each attribute stored in the point management unit on the basis of the point for each attribute received by the transmitting/receiving unit.

With this configuration, the point of each attribute can also be changed by communication with the outside.

According to a twelfth aspect of the invention, there is provided a video game processing program that causes a computer provided in a video game apparatus, which uses a plurality of items, the power value of each of which has a more advantageous effect the greater it is, and executes a virtual battle between a player character and an enemy character according to an operation input while allowing the player character to use one of the items, to function as: a point management unit that stores attributes in association with the items, converts a use frequency of the corresponding item by the player character into a point, and stores the converted point for each attribute; a ranking determination unit that determines the ranking of each attribute according to the number of the point stored in the point management unit; and a power value control unit that changes the power value of an item of each attribute according to the ranking of the attribute determined by the ranking determination unit.

With this configuration, the computer operates on the basis of the program, and thus the game apparatus according to the first aspect of the invention can be implemented. Therefore, the game technology according to the invention can be easily realized by a general-use computer or a general-use game apparatus.

According to a thirteenth aspect of the invention, there is provided a computer-readable program recording medium that is mounted in a video game apparatus, which uses a plurality of items, the power value of each of which has a more advantageous effect the greater it is, and executes a virtual battle between a player character and an enemy character according to an operation input while allowing the player character to use one of the items. The program recording medium has recorded thereon a program, which causes a computer to function as: a point management unit that stores attributes in association with the items, converts a use frequency of the corresponding item by the player character into a point, and stores the converted point for each attribute; a ranking determination unit that determines the ranking of each attribute according to the number of the point stored in the point management unit; and a power value control unit that changes the power value of an item of each attribute according to the ranking of the attribute determined by the ranking determination unit.

With this configuration, the program recorded on the recording medium is read by the computer, and thus the game apparatus according to the first aspect of the invention can be realized. In addition, the program can be easily distributed by the recording medium as a software product separately from the apparatus.

According to a fourteenth aspect of the invention, there is provided a video game processing method in a video game apparatus, which uses a plurality of items, the power value of each of which has a more advantageous effect the greater it is, and executes a virtual battle between a player character and an enemy character according to an operation input while allowing the player character to use one of the items. The method includes: storing attributes in association with the items, converting a use frequency of the corresponding item by the player character into a point, and storing the converted point for each attribute; determining the ranking of each attribute according to the number of the point stored in the storing of the point; and changing the power value of an item of each attribute according to the ranking of the attribute determined in the determining of the ranking.

Therefore, if the computer executes the processing in the above-described manner, the same advantages as those according to the first aspect of the invention can be obtained.

BRIEF DESCRIPTION OF THE DRAWINGS

FIG. 3 is a schematic view showing an item data table;

FIG. 4 is a schematic view showing a player character data storage unit;

FIG. 6 is a schematic view showing an area data table;

FIG. 7 is a schematic view showing a ranking effect table;

FIG. 8 is a schematic view showing a location-brand correspondence table;

FIG. 9 is a schematic view showing a price coefficient table;

FIG. 10 is a schematic view showing a boom/slump table;

DETAILED DESCRIPTION OF THE INVENTION

Figure 1:
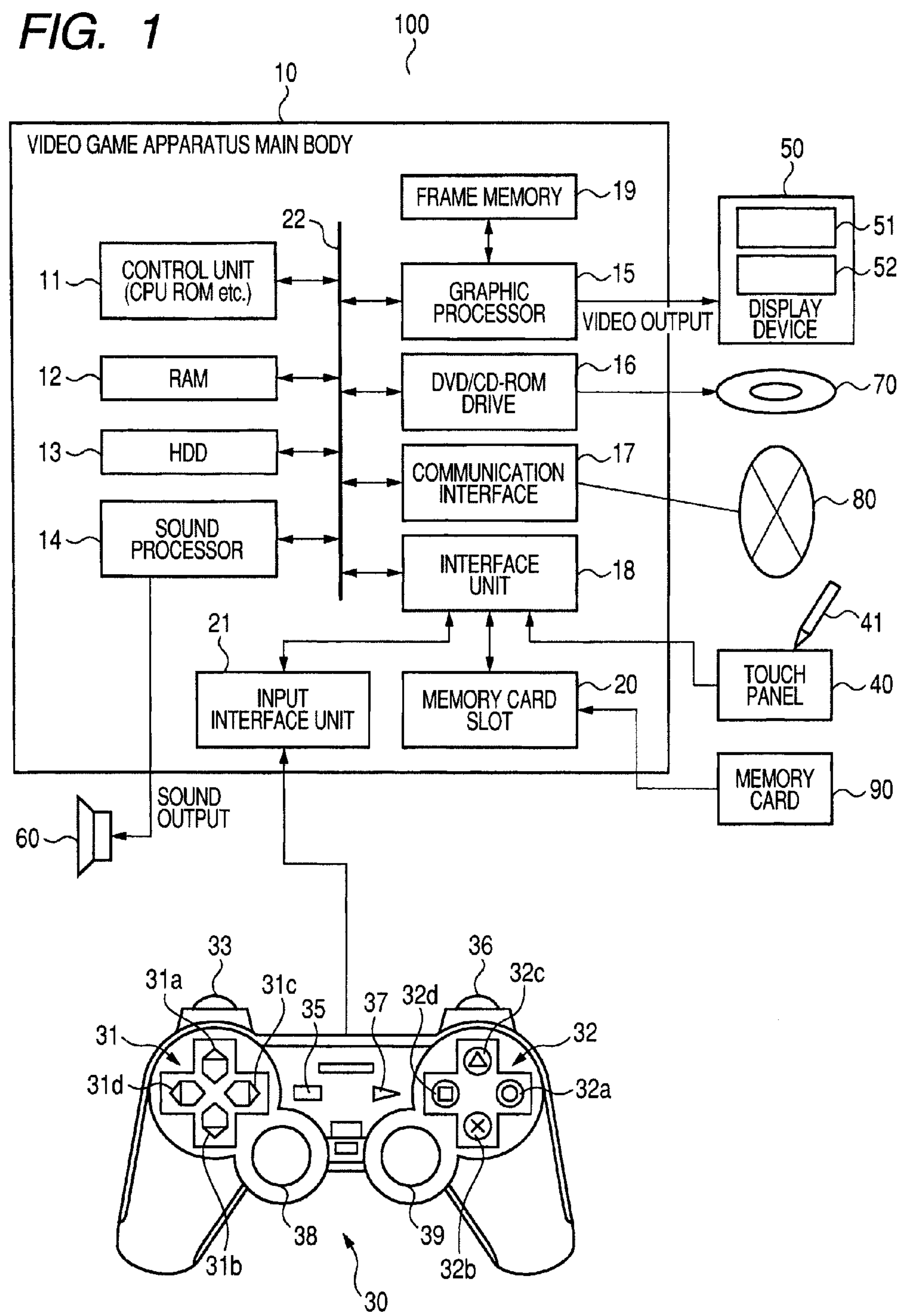
FIG. 1 is a block diagram showing the configuration of a video game apparatus according to an embodiment of the invention.

Hereinafter, an embodiment of the invention will be described with reference to the accompanying drawings. FIG. 1 is a block diagram showing the configuration of a video game apparatus 100 according to the embodiment of the invention. The video game apparatus 100 includes a video game apparatus main body 10, a display device 50, and a sound output device 60. The video game apparatus main body 10 is constituted from, for example, a video game machine that is put on the market. In addition, the display device 50 is constituted from, for example, a television apparatus or a liquid crystal display, and has a plurality of image display units, for example, an upper image display unit 51 and a lower image display unit 52.

The video game apparatus main body 10 includes a control unit 11, a RAM (Random Access Memory) 12, a HDD (Hard Disc Drive) 13, a sound processor 14, a graphic control unit 15, a DVD/CD-ROM drive 16, a communication interface 17, an interface unit 18, a frame memory 19, a memory card slot 20, and an input interface unit 21.

The control unit 11, the RAM 12, the HDD 13, the sound processor 14, the graphic control unit 15, the DVD/CD-ROM drive 16, the communication interface 17, and the interface unit 18 are connected to an internal bus 22.

The control unit 11 includes a CPU (Central Processing Unit), a ROM (Read Only Memory), and the like, and controls the entire video game apparatus 100 according to control programs stored in the HDD 13 or a storage medium 70. The control unit 11 includes an internal timer that is used to generate timer interruption. The RAM 12 is also used as a work area for the control unit 11.

The sound processor 14 functions as a sound input-output interface that performs D/A conversion or A/D conversion on a sound signal. The sound processor 14 is connected to the sound output device 60 which includes, for example, a speaker. The sound processor 14 outputs a sound signal to the sound output device 60 according to a sound output instruction from the control unit 11, which is executing a processing according to various control programs.

The graphic control unit 15 is connected to the display device 50 that has, for example, the upper image display unit 51 and the lower image display unit 52 for screen display. The graphic control unit 15 develops an image to the frame memory 19 according to a drawing instruction from the control unit 11, and simultaneously outputs, to the display device 50, video signals such that the upper and lower image display units 51 and 52 display images. A switching time for images to be displayed according to the video signals is set to 1/30 seconds per frame, for example.

The storage medium 70, such as DVD-ROM or CD-ROM, in which control programs for a game are stored, is mounted in the DVD/CD-ROM drive 16. The DVD/CD-ROM drive 16 reads out various kinds of data, such as control programs, from the storage medium 70. As the storage medium 70, in addition to the DVD-ROM or the CD-ROM, various DVDs (DVD-RAM, DVD-R, DVD-RW, DVD+R, DVD+RW, DVD+R DL) or various CDs (CD-R, CD-RW, and the like) may be used.

The communication interface 17 is connected to a communication network 80, such as Internet, in a wireless or wired manner. The video game apparatus main body 10 performs communication with, for example, another computer through the communication network 80 using a communication function of the communication interface 17.

The input interface unit 21, the memory card slot 20, and a touch panel 40 as an operation input unit (controller) are connected to the interface unit 18. The interface unit 18 causes the RAM 12 to store instruction data from the input interface unit 21 on the basis of operation of a keypad 30 by a player and instruction data on the basis of operation of the touch panel 40 with a touch pen 41 by the player. In response to the instruction data stored in the RAM 12, the control unit 11 executes various arithmetic processing.

The touch panel 40 may be stacked on a display screen of at least one of the upper and lower image display units 51 and 52. In this case, by managing and controlling a display timing of one of the upper and lower image display units 51 and 52, on which the touch panel 40 is stacked, and an operation timing with the touch pen 41 on the touch panel 40 and the coordinates of a position where the touch pen 41 touches, the control unit 11 recognizes input information according to operation input by input operation from a player. Moreover, the display device 50 may constitute a display screen from a single image display unit, instead of having a plurality of image display units, such as the upper and lower image display units 51 and 52.

As described above, the video game apparatus main body 10 is connected to the touch panel 40 through the interface unit 18 and simultaneously connected to the keypad 30 as an operation input unit (controller) through the input interface unit 21.

A cross key 31, a group of buttons 32, a left joystick 38, and a right joystick 39 are arranged on the upper surface of the keypad 30. The cross key 31 includes an up key 31*a*, a down key 31*b*, a right key 31*c*, and a left key 31*d*, and the group of buttons 32 include a circle button 32*a*, a x button 32*b*, a triangle button 32*c*, and a square button 32*d*. Furthermore, a select button 35 or a start button 37 is arranged at a connection portion between a base on which the cross key 31 is arranged and a base on which the group of buttons 32 are arranged. In addition, a plurality of buttons such as an R1 button 36 and an L1 button 33 are arranged on the side surface of the keypad 30.

Two types of detection signals generated in the keypad 30 are supplied to the input interface unit 21. That is, the detection signals from the keypad 30 pass through the input interface unit 21, by which detection information indicating which button on the keypad 30 is pressed and detection information indicating the state of each of the left joystick 38 and the right joystick 39 are generated. In this way, an operation instruction (operation input) by a user using the keypad 30 is supplied to the video game apparatus main body 10.

Furthermore, the interface unit 18 performs, according to the instruction from the control unit 11, a processing to store data indicative of the progress of the game stored in the RAM 12 into a memory card 90 installed in the memory card slot 20. The interface unit 18 also performs a processing to read out data on the game stored in the memory card 90 at the time of suspending the game and to transmit such data to the RAM 12, or the like.

Various kinds of data, such as the control programs for performing the game with the video game apparatus 100, are stored in, for example, the storage medium 70. Various kinds of data, such as the control programs, stored in the storage medium 70 are read out by the DVD/CD-ROM drive 16, in which the storage medium 70 is mounted, and loaded onto the RAM 12.

The control unit 11 performs, according to the control programs loaded onto the RAM 12, various kinds of processing, such as a processing to output a drawing command to the graphic control unit 15 and a processing to output a sound output command to the sound processor 14. Moreover, while the control unit 11 performs the processing, interim data generated according to the progress of the game is stored in the RAM 12 used as a work memory.

Next, regions that are portioned in the RAM 12 shown in FIG. 1, and data to be stored in each region will be described in detail.

Figure 2:
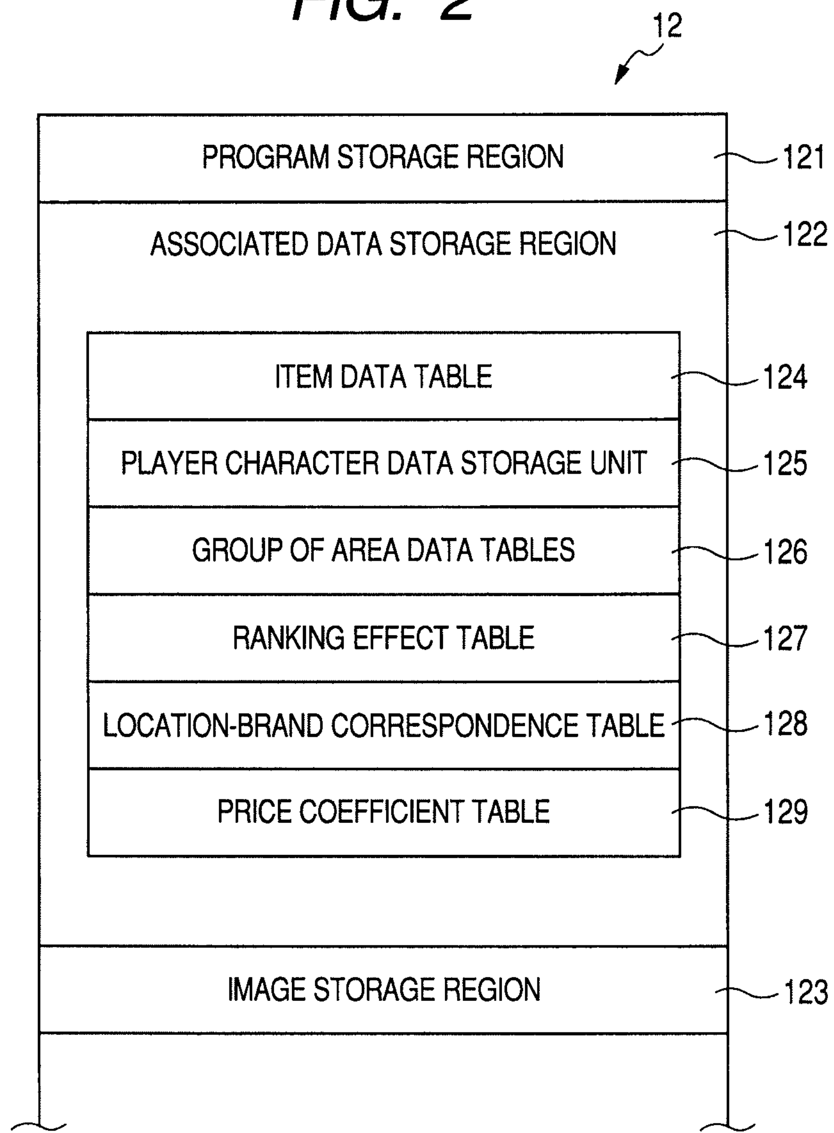
FIG. 2 is a diagram showing regions that are portioned in a RAM.

FIG. 2 is a diagram showing regions that are portioned in the RAM 12. As shown in FIG. 2, a program storage region 121, an associated data storage region 122, an image storage region 123, and the like are portioned in the RAM 12. The control unit 11 reads out the programs and data stored in the regions 121 to 123 from the storage medium 70 or the memory card 90, and transmits the read programs or data to the RAM 12.

The program storage region 121 stores programs required for executing the game, such as programs shown in the flowcharts described below.

In the associated data storage region 122, an item data table 124, a player character data storage unit 125, a group of area data tables 126, a ranking effect table 127, a location-brand correspondence table 128, a price coefficient table 129, and a boom/slump table 130 are formed.

The item data table 124 stores, as shown in FIG. 3, 'ID', 'ITEM NAME', 'CATEGORY', 'BRAND', 'PRICE', and 'POWER (OFFENSIVE POWER/RECOVERY POWER)' for each usable item of the player character. 'ID' is a 4-digit serial number of each item. 'ITEM NAME' represents the name of an item on the game or the content of a skill to be executed when the player character holds the item. 'CATEGORY' represents the effect of a skill for offense or recovery. 'BRAND' represents which brand of 13 kinds of brands to be described below the item belongs to. 'PRICE' represents a reference price when the item is bought or sold on the game. 'POWER (OFFENSIVE POWER/RECOVERY POWER)' represents a power value (offensive power value/recovery power value) as a reference when the player character uses the item.

In this embodiment, the 13 kinds of brands are symbolized with 13 kinds of animals, that is, the 12 zodiac animals from 'RAT' to 'BOAR' and a cat.

Moreover, each of the brands is assigned with an image color. Accordingly, each brand may also be called according to the color, such as a red brand, a blue brand, or a green brand.

The player character data storage unit 125 stores, as shown in FIG. 4, 'ACQUIRED ITEM' indicative of an item acquired by a player character, and 'HELD ITEM' indicative of an item selected and held by the player character from 'ACQUIRED ITEM' according to 'ID' assigned by the item data table 124. The player character data storage unit 125 also stores 'POSSESSION MONEY' indicative of usable virtual money in the game. 'POSSESSION MONEY' increases or decreases each time an item is bought or sold.

Though not shown, when a battle between a player character and an enemy character is executed, a battle management table is provided to manage a current life force (hereinafter, simply referred to as 'HP (Hit Point)') of each character, or to manage how many times the player character carries out an attack (or defense) with an item. Data stored in the battle management table is cleared when a next battle starts after the battle ends.

Accordingly, by referring to the player character data storage unit 125, the item data table 124, and the battle management table, it is possible to identify which brand an item held by the player character when the battle starts, or a used item belongs to.

Figure 5:
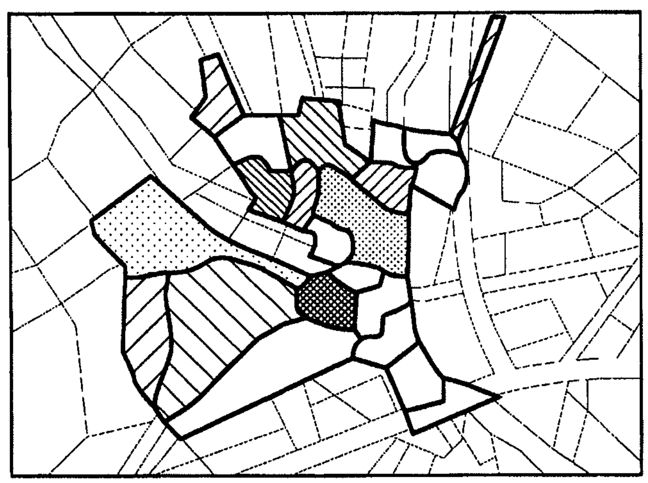
FIG. 5 is a diagram showing an area on a game in this embodiment.

In case of the game according to this embodiment, as shown in FIG. 5, a real area 'Shibuya' is divided into 23 areas (also referred to as 'stage' or 'location'). Enemy characters and a boss character are arranged in each of the first to 23-th areas, and then a battle is executed within the area. Furthermore, the group of area data tables 126 is provided with area data tables 126-1 to 126-23 shown in FIG. 6 corresponding to the first to 23-th areas. In FIG. 6, only the area data table 126-1 for a single area is shown.

As shown in FIG. 6, each of the 23 area data tables 126-1 to 126-23 stores 'ADDITION VALUE CORRECTION COEFFICIENT', 'BRAND', 'PREVIOUS BRAND POINT', 'VARIABLE VALUE', 'CORRECTED VARIABLE VALUE', 'BRAND POINT IMMEDIATELY AFTER VARIATION', and 'NEW BRAND POINT'. 'ADDITION VALUE CORRECTION COEFFICIENT' is a coefficient that is equal to or less than '1' and multiplied to 'VARIABLE VALUE', and randomly changes. 'BRAND' represents the above-described 13 brands from 'RAT' to 'CAT'. 'PREVIOUS BRAND POINT' is a percentage indicative of a market penetration factor of a brand in an area immediately before a battle starts.

It is assumed that the area data table shown in FIG. 6 is the area data table 126-1 of the first area. Then, in the first area, the brand 'CAT' having the previous brand point '14%' is 'BEST 1', and the brand 'BOAR' having the previous brand point '13%' is 'BEST 2'. In addition, the brand 'TIGER' having the previous brand point '3%' is 'WORST 2', and the brand 'RAT' having the previous brand point '2%' is 'WORST 1'.

'VARIABLE VALUE' is a reference value at the time of calculating a point to be added to the previous brand point at the end of the result, such as a current battle or an item transaction in a virtual shop. This is determined depending on the state of an item held by the player character or the content of an item (skill) used by the player during the battle. In regard to point addition when the player character holds an item, for example, '1 point' is given for each held item, '1 point' is given each time an item is used in the battle, and then the points are totalized when the battle ends, or points according to an item transaction in the area are totalized ('VARIABLE VALUE' may be automatically corrected according to the values of the boom/slump table 130, as described below). For example, if the player character holds 5 items of the brand 'RAT', and uses each item once during a battle against the enemy character, the point of the brand 'RAT' is '10', which is obtained by totalizing a point addition value '5' when the player character holds items, and a point addition value '5' when the items are used in the battle. This point becomes 'VARIABLE VALUE'.

In this embodiment, 'VARIABLE VALUE' is the sum value of the number of items held by the player character, the number of utilizations of the items in the battle, and the number of transactions of the items. Alternatively, only the number of utilizations of the items in the battle by the player character may become 'VARIABLE VALUE'.

'CORRECTED VARIABLE VALUE' is a value that is obtained by 'VARIABLE VALUE'×'ADDITION VALUE CORRECTION COEFFICIENT'. For example, in case of 'RAT', since 'VARIABLE VALUE' is '10.00' and 'ADDITION VALUE CORRECTION COEFFICIENT' is '0.5', '10.00×0.5=5.00', that is, 'CORRECTED VARIABLE VALUE' becomes '5.00'.

'BRAND POINT IMMEDIATELY AFTER VARIATION' is a value that is obtained by adding 'CORRECTED VARIABLE VALUE' to 'PREVIOUS BRAND POINT', and is calculated in '%'. For example, in case of 'RAT', since 'PREVIOUS BRAND POINT' is '2.00%' and 'CORRECTED VARIABLE VALUE' is '5.00', '2.00+5.00=7.00%', that is, 'BRAND POINT IMMEDIATELY AFTER VARIATION' becomes '7.00%'.

The sum value of 'BRAND POINT IMMEDIATELY AFTER VARIATION' for the 13 brands exceeds 100%, and as shown in FIG. 6, becomes '157.50%'. Then, a value obtained by rounding 'BRAND POINT IMMEDIATELY AFTER VARIATION' to 100% is set to 'NEW BRAND POINT'. Of course, 'NEW BRAND POINT' becomes 'PREVIOUS BRAND POINT' when a next battle starts. In this way, by rounding the point calculated by adding the variable value every time to 100%, the point of each brand not only simply increases according to the progress of the game, but decreases on the basis of the relative relationship with the point of another brand.

The ranking effect table 127 stores, as shown in FIG. 7, 'POWER (OFFENSIVE POWER/RECOVERY POWER) THREE TIMES' in association with 'BEST 1', 'POWER (OFFENSIVE POWER/RECOVERY POWER) 1.5 TIMES' in association with 'BEST 2', 'POWER (OFFENSIVE POWER/RECOVERY POWER) 0.5 TIMES' in association with 'WORST 2', and 'BADGE UNAVAILABLE' in association with 'WORST 1'. Here, 'BEST 1', 'BEST 2', 'WORST 2', and 'WORST 1' represent rankings according to 'PREVIOUS BRAND POINT' in the 23 area data tables 126-1 to 126-23. In addition, each of 'POWER (OFFENSIVE POWER/RECOVERY POWER) THREE TIMES', 'POWER (OFFENSIVE POWER/RECOVERY POWER) 1.5 TIMES', and 'POWER (OFFENSIVE POWER/RECOVERY POWER) 0.5 TIMES' represents 'POWER (OFFENSIVE POWER/RECOVERY POWER)' in the item data table 124 shown in FIG. 3.

As described above, when it is assumed that the area data table shown in FIG. 6 is the area data table 126-1 of the first area, in the first area, the brand 'CAT' having the previous brand point '14%' is 'BEST 1', and the brand 'BOAR' having the previous brand point '13%' is 'BEST 2'. In addition, the brand 'TIGER' having the previous brand point '3%' is 'WORST 2', and the brand 'RAT' having the previous brand point '2%' is 'WORST 1'. Then, when a player character executes a battle against an enemy character in the first area, if it is assumed that an item of the brand 'CAT', which is 'BEST 1', is used, and its power (offensive power/recovery power) is '50', the player character can execute the battle against the enemy character with the power (offensive power/recovery power) '150' corresponding to three times larger than the reference power '50'. Furthermore, if an item of the brand 'BOAR', which is 'BEST 2', is used, and its power (offensive power/recovery power) is '50', the play character can execute the battle against the enemy character with the power (offensive power/recovery power) '75' corresponding to one and half times larger than the reference power '50'. However, if an item of the brand 'TIGER', which is 'WORST 2', is used, and its power (offensive power/recovery power) is '50', the player character executes the battle against the enemy character with the power (offensive power/recovery power) '25' corresponding to half of the reference power. An item of the brand 'RAT', which is 'WORST 1', cannot be used.

In the location-brand correspondence table 128, as shown in FIG. 8, the vertical axis represents codes indicating the 23 areas (locations), and the horizontal axis represents the numeric values from 1 to 13 corresponding to the 13 brands. At the intersection areas thereof, 'VARIABLE VALUE' shown in FIG. 6 is added and stored. Then, when the player character executes a battle with the brand 8 (sheep) in an area 'no001', as shown in a region A, an acquisition point of 'BRAND 8' in the area 'no001' increases.

'DOMINANT BRAND' refers to a brand, the acquisition point of which exceeds 30% of the total in the corresponding area. Referring to FIG. 8, 'BRAND 11' in an area 'ce002', 'BRAND 8' in an area 'no001', 'BRAND 9' in an area 'no004', and the like are the dominant brands. An area where a dominant brand exists is displayed on a map in image color of the corresponding brand through a processing described below. Of course, if the acquisition point of another brand increases, the percentage of the dominant brand is comparatively lowered. If the percentage is equal to or less than 30%, it is in a state 'NO DOMINANT BRAND', and the color of the corresponding area is changed to an initial color, that is, gray.

Each of the numerals in a frame B at the lower portion is the total point for each brand. Accordingly, the brand ranking over Shibuya can be determined according to the total point. The price coefficient table 129 stores, as shown in FIG. 9, in correspondence with the first to 13-th rankings over Shibuya, a coefficient to be multiplied to a price (see FIG. 3) when an item of a corresponding brand is bought or sold. Referring to FIG. 3, although the price of the item 'FIRE (lev.1)' corresponding to the ID '0001' is '100', if the brand 'CAT' of the item 'FIRE (lev.1)' corresponding to the ID '0001' is the first ranking, the item is bought or sold at a price, '500', which is five times higher than the reference price. To the contrary, if the brand 'CAT' of the item 'FIRE (lev.1)' corresponding to the ID '0001' is the 13-th ranking, the item is bought or sold at a price, '25', which is quarter of the reference price.

The boom/slump table 130 stores, as shown in FIG. 10, actual time 0 to 23 o'clock in correspondence with a first week, a second week, a third week, . . . , for which a player plays a game in an actual time. The boom/slump table 130 also stores the brand name, which is turned into 'boom', or the brand name, which is turned into 'slump', in correspondence with each actual time. Within the actual time, in case of a brand, which is turned into 'boom' each time the battle ends, a predetermined fixed value is added to 'VARIABLE VALUE' of the area data tables 126-1 to 126-23 shown in FIG. 6. To the contrary, in case of a brand, which is turned into 'slump', 'VARIABLE VALUE' is set to '0'. In this way, by varying 'VARIABLE VALUE', even if the player willingly buys or sells an item of a specific brand to promote the ranking of the corresponding brand, or executes a battle while holding the corresponding item, a ranking manipulation cannot easily progress just as the player intended.

Accordingly, 'VARIABLE VALUE' of the area data tables 126-1 to 126-23 shown in FIG. 6 may be automatically corrected according to the values of the boom/slump table 130.

Next, a processing procedure of a game according to an embodiment of the invention will be described with reference to flowcharts of FIG. 11 and later. A processing described below is a processing that is executed in a case where the control unit 11 controls other constituent elements in the game apparatus on the basis of a game program stored in the storage medium 70.

Figure 11:
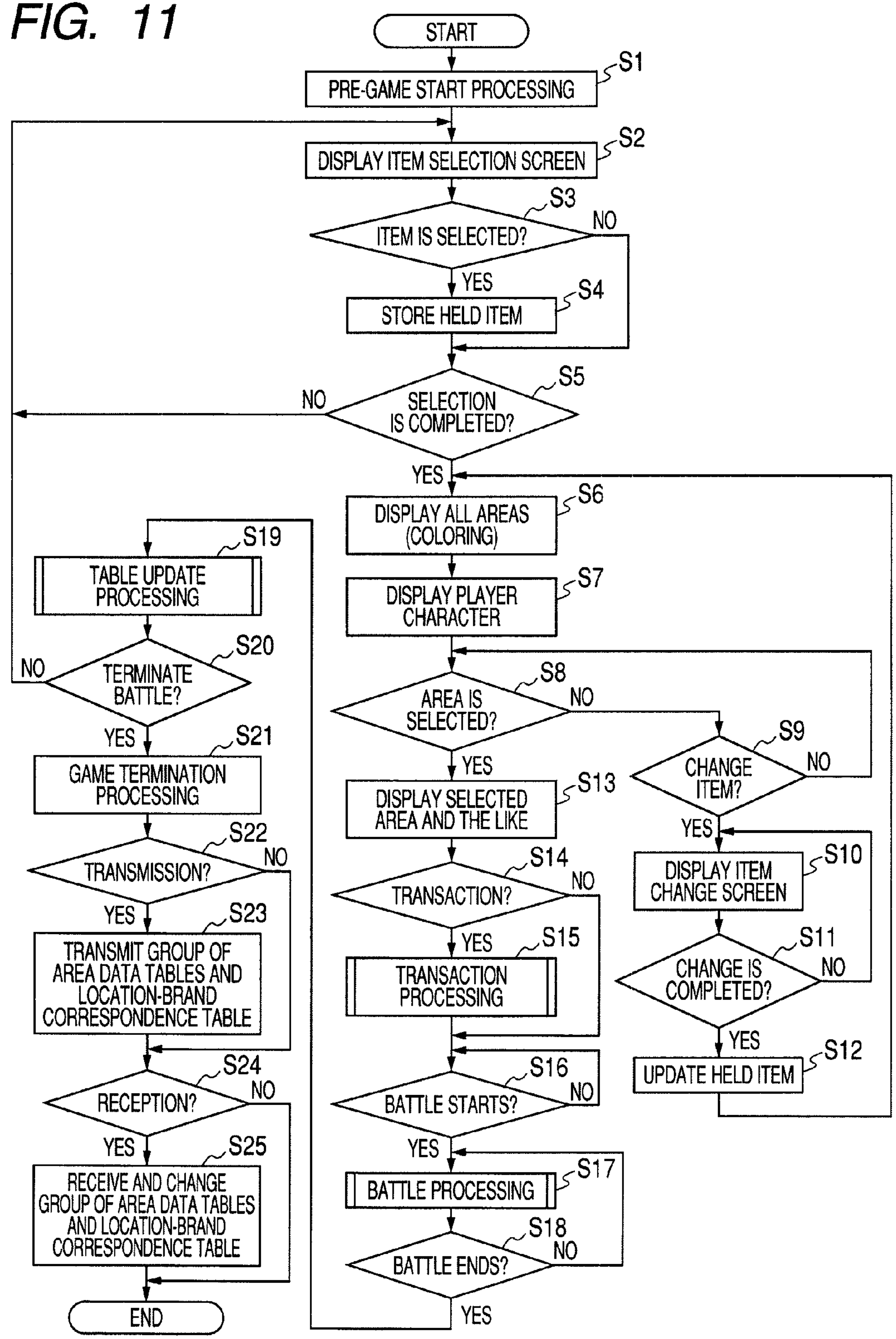
FIG. 11 is a flowchart showing a processing procedure according to this embodiment.

FIG. 11 is a flowchart showing a processing in the entire game. First, the control unit 11 executes a pre-game start processing (Step S1) to portion the program storage region 121, the associated data storage region 122, the image storage region 123, and the like in the RAM 12, as shown in FIG. 2, and stores the above-described data and the like read out from the storage medium 70 or the memory card 90 in the areas. Next, the control unit 11 causes, for example, the lower image display unit 52 of the display device 50 to display a selection screen for selecting an item to be held by the player character from 'ACQUIRED ITEM' stored in the player character data storage unit 125 (Step S2).

Next, it is determined whether or not an item to be held by the player character is selected from 'ACQUIRED ITEM' by operation of the keypad 30 on the selection screen (Step S3). If an item to be held is selected, its ID is stored in 'HELD ITEM' of the player character data storage unit 125 (Step S4). In addition, it is determined whether or not item selection is completed, and a loop of Steps S2 to S5 is repeated until the selection is completed. Accordingly, the player can allow the player character to hold a plurality of items. The maximum number of items to be held by the player character may be limited to, for example, 4 or the like.

Figure 15A:
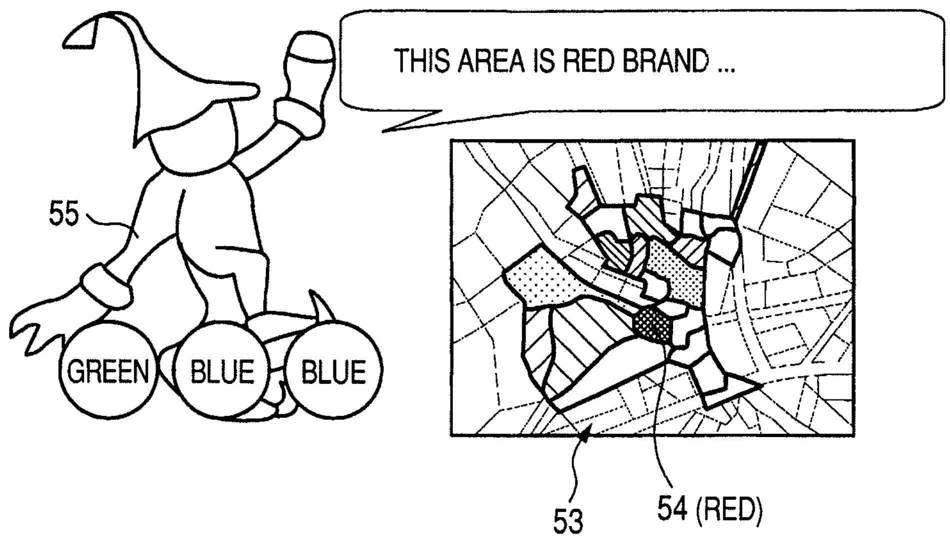
FIGS. 15A and 15B are diagrams showing a display example.

After the items to be held are selected, as shown in FIG. 15A, for example, the upper image display unit 51 of the display device 50 displays an entire area map 43 including all of the areas ce001 to we004 (Step S6) and simultaneously displays the player character (Step S7). At the time of display of all of the areas in Step S5, the location-brand correspondence table 128 shown in FIG. 8 is referred to. Among the areas ce001 to we004, an area where the acquisition point exceeds 30% and 'DOMINANT BRAND' is present is displayed in an image color of the corresponding brand. As shown in FIG. 15A, for example, an area 54 is displayed red on the entire area map 43.

Figure 15B:
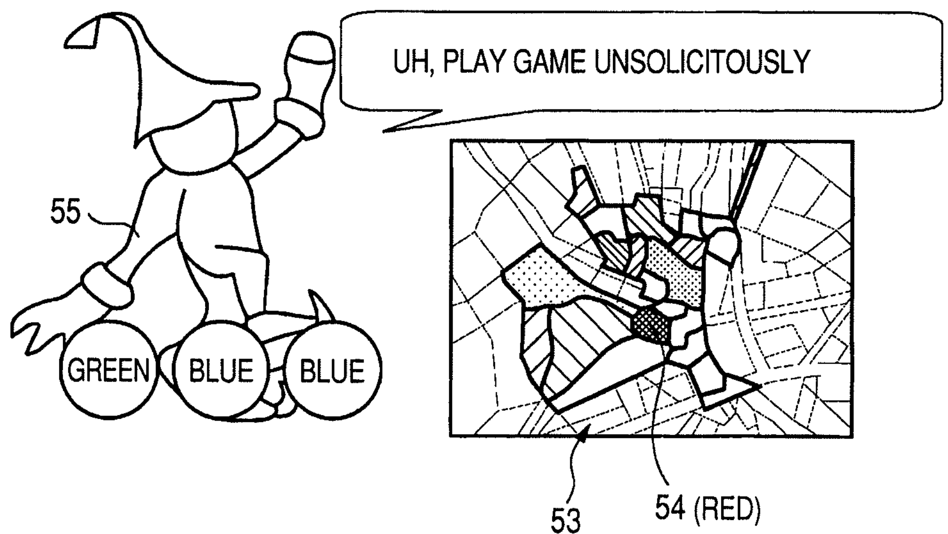
Figure 16A:
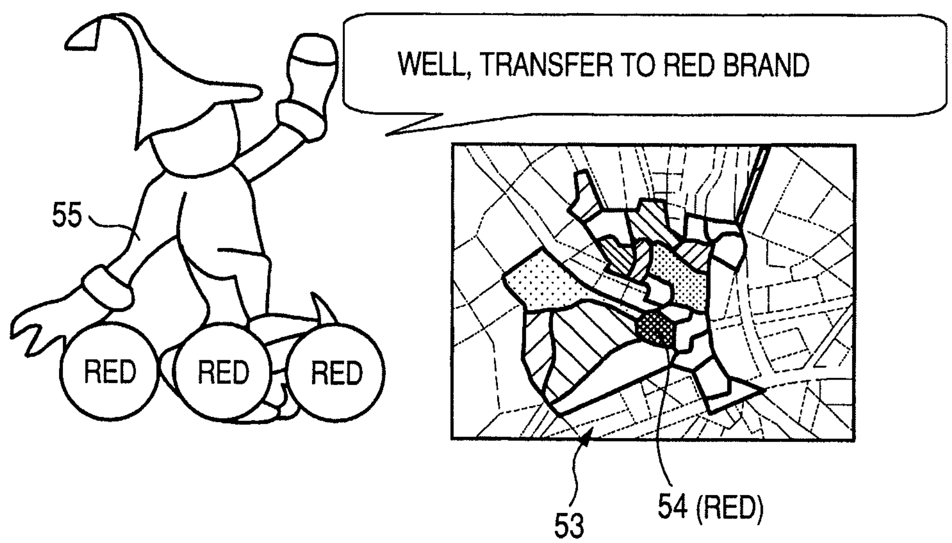
FIGS. 16A and 16B are diagrams showing a display example.
Figure 16B:
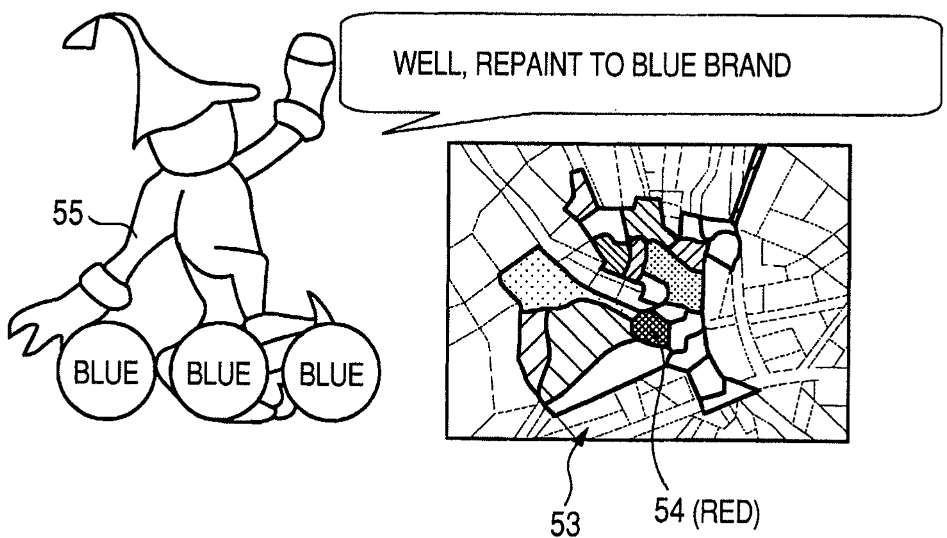

As shown in FIG. 15A, when items held by a player character 55 are green, blue, and blue brand items, as shown in FIG. 15B, the game may be played unsolicitously, that is, the red area 54 may be selected as it is. In addition, as shown in FIG. 16A, the held items may be all changed to the red brand, and as shown in FIG. 16B, the red area 54 may be repainted blue, and the held items may be all changed to the blue brand.

As shown in FIG. 15B, at the time of playing the game unsolicitously, if the player touches the area 54 with the touch pen 41, it is determined YES in Step S8, and thus the process progresses from Step S8 to Step S12. Meanwhile, if the player does not touch the area 54 with the touch pen 41, it is determined NO in Step S8, and thus the process progresses from Step S8 to Step S9. Then, a loop of Steps S8, S9, and S8 is repeated in that order.

In a state where the loop is repeated, when the player wants to change the held items, for example, to change all of the held items to the red brand or to change all of the held items to the blue brand, the player instructs to change the held items with the touch pen 41. If so, it is determined YES in Step S9, and the process progresses from Step S9 to Step S10. Then, a screen for changing the held items to desired contents is displayed.

If the held items are all changed, it is determined YES in Step S11. Accordingly, in Step S12, the IDs of the changed held items are written into 'HELD ITEM' of the player character data storage unit 125 to update 'HELD ITEM' of the player character data storage unit 125 (Step S12). Next, the process returns to the area selection screen (Step S6).

In a state where the above-described loop of Step S8, S9, and S8 is repeated, if the player touches the area 54 with the touch pen 41, it is determined YES in Step S8. Then, only the selected area is displayed in detail on magnified scale, and simultaneously the player character is displayed in the area (Step S13). At the time of displaying the selected area in detail on magnified scale, a map image that is closely related to a department store and a building existing in the area 54 of Shibuya is displayed.

In addition, at the time of displaying the selected area in detail on magnified scale, display is performed whether or not 'DOMINANT BRAND' exists in the corresponding area. In this embodiment, when the red brand is a dominant brand in the area 54, a plurality of non-player character (NPC: a character that operates under the control of the game machine (specifically, under the control of the control unit 11)), which are called a brand mania, are displayed, and the background is also changed by adding the sign of the dominant brand to a building or the like in the area. To the contrary, when the dominant brand does not exist, a map image that is closely related to a department store and a building existing in the area 54 of Shibuya is simply displayed.

Next, it is determined whether a transaction operation of an item is made or not (Step S14). If the transaction operation is made, a transaction processing is executed (Step S15). Furthermore, it is determined whether or not a battle between a player character and an enemy character starts (Step S16). If the battle starts, a battle processing is executed (Step S17). In addition, during the battle, if the player character or the enemy character wins, and the battle result is generated, it is determined whether or not the battle ends (Step S18).

If the battle result is generated, and the battle ends, a table update processing is executed (Step S19). Accordingly, the table update processing is executed each time the battle result is generated and the battle ends. Subsequently, it is determined whether or not the player instructs to terminate the game with the keypad 30 (Step S20). Until the game termination instruction is input, the processing from Step S2 is repeatedly performed. When the game termination instruction is input, a game termination processing is executed, data to be preserved, which is stored in the associated data storage region 122, is preserved in the memory card 90 (Step S21).

Accordingly, the group of area data tables 126 and the location-brand correspondence table 128, in which data during the game is written, are also preserved in the memory card 90, together with other data during the game.

Next, it is determined whether a transmission instruction is input or not (Step S22). When the transmission instruction is input, the group of area data tables 126 and the location-brand correspondence table 128 are transmitted to the outside through the communication interface 17 and the communication network 80 (Step S23). Next, it is determined whether or not a reception instruction is input (Step S24). When the reception instruction is input, the group of area data tables and the location-brand correspondence table are received from the outside through the communication interface 17 and the communication network 80, and the group of area data tables 126 and the location-brand correspondence table 128 stored in the memory card 90 are changed (Step S25).

The change of the group of area data tables 126 and the location-brand correspondence table 128 stored in the memory card 90 may be performed by overwriting the group of area data tables and the location-brand correspondence table received from the outside as they are. Alternatively, it may be performed by changing each of the values of the group of area data tables 126 and the location-brand correspondence table 128 to the average of corresponding values thereof. In this way, the group of area data tables 126 and the location-brand correspondence table 128, which are changed according to his/her play, can be reflected in data of another player. To the contrary, the group of area data tables 126 and the location-brand correspondence table 128, which are changed according to another player's play, can be reflected in his/her play.

Figure 12:
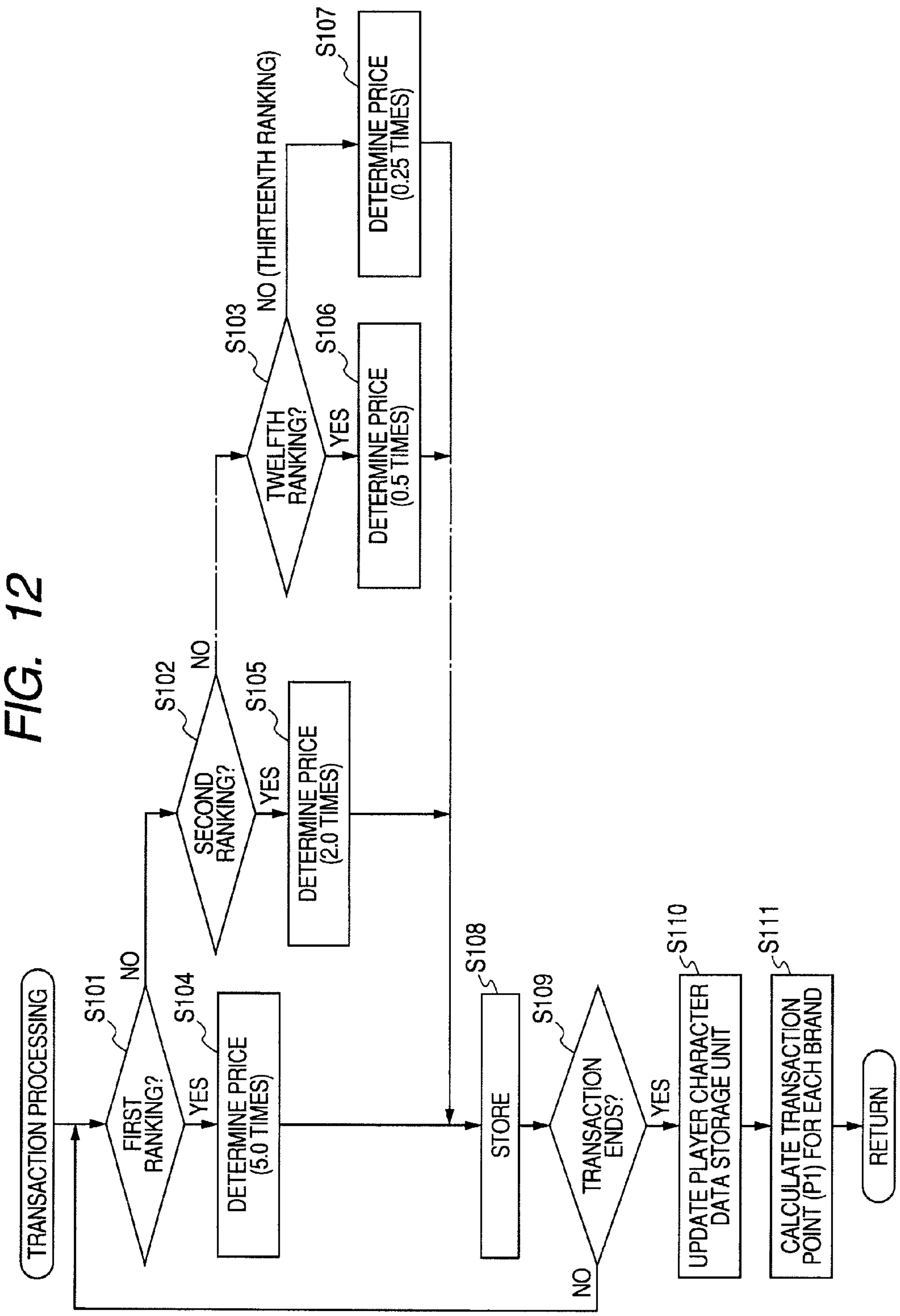
FIG. 12 is a flowchart showing the details of a transaction processing.

FIG. 12 is a flowchart showing the details of the transaction processing (Step S15). It is discriminated which ranking an item to be bought or sold takes among the first to 12-th brand rankings in the corresponding area over Shibuya (Steps S101 . . . S103).

As described above, in the location-brand correspondence table 128, each of the numerals in the frame B at the lower portion is the total point for each brand. Accordingly, the first to 13-th brand rankings can be determined over Shibuya according to the total point. Then, by comparing the brand rankings over Shibuya with the brand of an item to be bought or sold by a player in the area, it is discriminated which ranking the item to be bought or sold takes among the first to 12-th brand rankings over Shibuya. Of course, if the item does not correspond to the first to 12-th brand rankings (Step S103; NO), the brand of the item to be bought or sold takes the 13-th ranking.

In this way, if the first to 13-th brand rankings of the items to be bought or sold are discriminated, by referring to the price coefficient table 129 shown in FIG. 9 and the reference price of 'PRICE' in the item data table 124 shown in FIG. 3, a price is determined (Steps S104, S105, . . . , S106, and S107). That is, if the item to be bought or sold takes the first brand ranking, the price of the item is determined to be 5.0 times higher than the reference price. If the item takes the second brand ranking, the price of the item is determined to be 2.0 times higher than the reference price, . . . , if the 12-th brand ranking, 0.5 times, and if it takes the 13-th brand ranking, its price is determined to be 0.25 times than the reference price. Accordingly, as described above, in FIG. 3, even if the price of the item 'FIRE (lev.1)' of the ID '0001' is '100', when the brand 'RAT' of the item 'FIRE (lev.1)' of the ID '0001' takes the first ranking, the item is bought or sold at a price, '500', which is 5 times higher than the reference price. To the contrary, if the brand 'RAT' of the item 'FIRE (lev.1)' of the ID '0001' takes the 13-th ranking, the item is bought or sold at a price, '25', which is 0.25 times lower than the reference price.

In this way, if the item to be bought or sold and the price are determined, the item to be bought or sold and the price are stored in the work area of the RAM 12 (Step S108). Next, it is determined whether or not the transaction ends (Step S108). The processing from Step S101 is repeated until the transaction ends.

Here, the brand ranking over Shibuya is displayed on, for example, the upper image display unit 51 of the display device 50 according to the player's demand through the operation of the keypad 30 or continuously, such that the player can view the brand ranking. Accordingly, the player can get a gain by selling an item of a higher-ranking brand from the acquired items of the player character at a high price, and can purchase an item of a lower-ranking brand in large quantities at a low price.

If the transaction ends, the player character data storage unit 125 is updated. That is, on the basis of the data stored in the work area of the RAM 12 in Step S108, when the player purchases an item, its ID is written into 'ACQUIRED ITEM' of the player character data storage unit 125, and the total amount of purchase money is subtracted from 'POSSESSION MONEY' to update 'POSSESSION MONEY'. In addition, when the player sells an item, its ID is erased from 'ACQUIRED ITEM' of the player character data storage unit 125, and the total amount of sales is added to 'POSSESSION MONEY' to update 'POSSESSION MONEY'.

Furthermore, a transaction point P1 for each brand is calculated (Step S111). The transaction point P1 is a 1 point every transaction, regardless of the price. Accordingly, by purchasing the item of the lower-ranking brand at a low price in large quantities, the transaction point P1 can be increased without needing costs.

Figure 13:
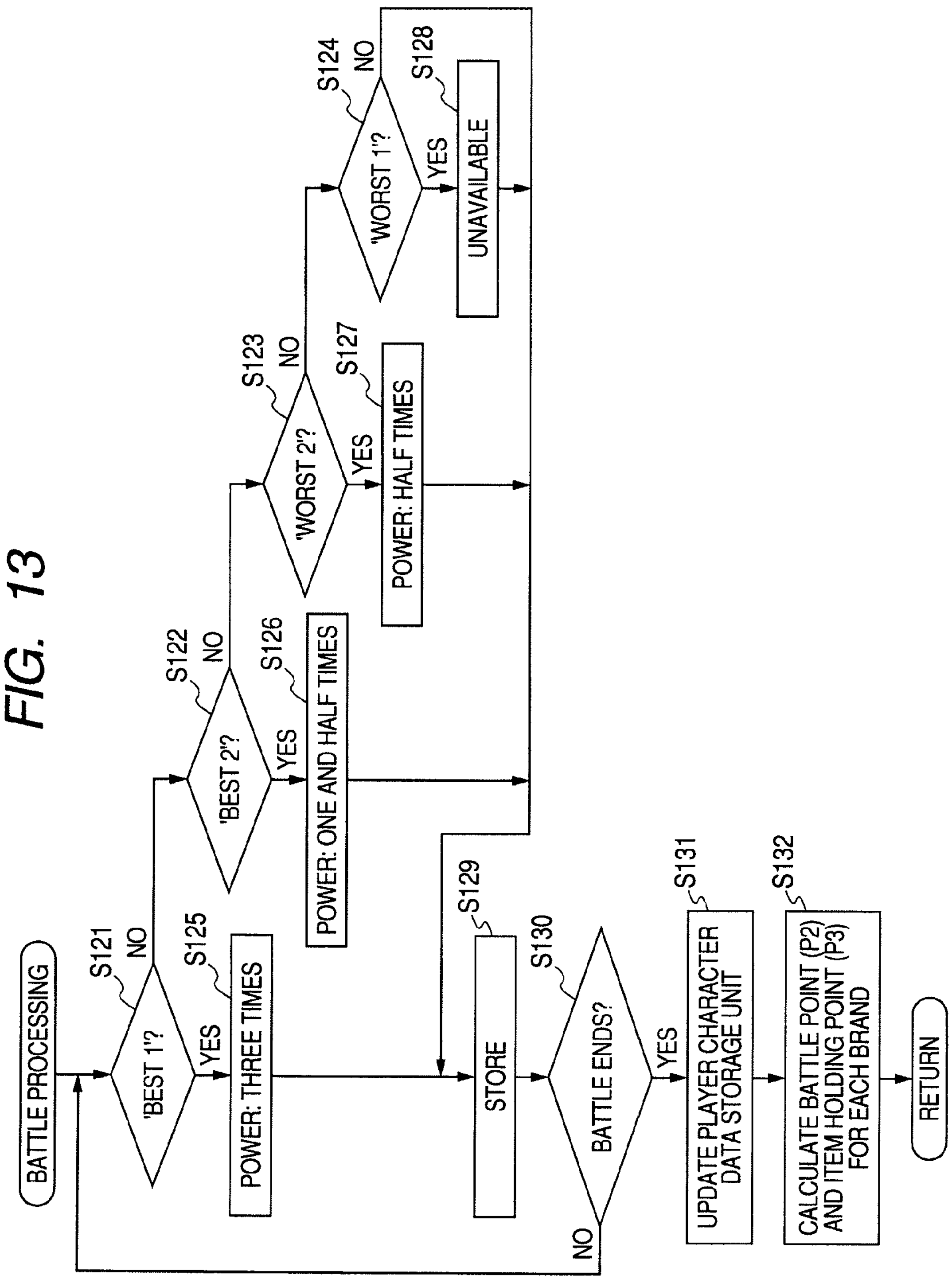
FIG. 13 is a flowchart showing the details of a battle processing.

FIG. 13 is a flowchart showing the details of the battle processing (Step S17). It is discriminated whether the brand of an item used by the player character in the selected area is 'BEST 1', 'BEST 2', 'WORST 2', or 'WORST 1' in that area (Steps S121 to S124).

As described above, the group of area data tables 126 is provided with the area data tables 126-1 to 126-23 shown in FIG. 6 in correspondence with the first to 23-th areas. Here, it is assumed that an area, which is selected by the player and in which the player character executes a battle against the enemy character, is the first area, and the area data table shown in FIG. 6 is the area data table 126-1 of the first area. Then, in the first area, the brand 'CAT' having the brand point '14%' is 'BEST 1', and the brand 'BOAR' having the brand point '13%' is 'BEST 2'. In addition, the brand 'TIGER' having the brand point '3%' is 'WORST 2', and the brand 'RAT' having the brand point '2%' is 'WORST 1'.

The reference power of each item can be obtained by referring to 'POWER (OFFENSIVE POWER/RECOVERY POWER)' of the item data table 124 shown in FIG. 3. Accordingly, when an item of the brand 'CAT', which is 'BEST 1', is used, and the reference power of the item is '100', on the basis of the ranking effect table 127 shown in FIG. 7, the power (offensive power/recovery power) is set to '300' three times higher than the reference power (Step S125), and then the battle processing against the enemy character is performed. If an item of the brand 'BOAR', which is 'BEST 2', is used, and the reference power of the item is '100', the power (offensive power/recovery power) is set to '150', which is one and half times higher than the reference power (Step S126). In addition, if an item of the brand 'TIGER', which is 'WORST 2', is used, and the reference power of the item is '100', the power (offensive power/recovery power) is set '50' 0.5 times lower than the reference power (Step S127), and then the battle processing against the enemy character is performed.

In regard to an item of the brand 'RAT', which is 'WORST 1', it becomes unavailable (Step S128). In addition, in regard to an item of a brand other than 'BEST 1', 'BEST 2', 'WORST 2', and 'WORST 1', the battle processing against the enemy character is performed using the reference power stored in 'POWER (OFFENSIVE POWER/RECOVERY POWER)' of the item data table 124 shown in FIG. 3.

Accordingly, since the power of the item becomes higher or lower than the reference power, or unavailable, the battle against the enemy character is not developed just as the player expected, such that the player can get stimulation from the battle or game development. As a result, the game can be made more interesting.

If the player character uses an item, the kind of used item and the use frequency of the item, and the kind of lost item are stored in the work area of the RAM 12 (Step S129). Next, it is determined whether or not victory or defeat of a single battle is decided and the battle ends (Step S130). The processing from Step S121 is repeated until victory or defeat of the battle is decided and the battle ends.

If it is determined that the victory or defeat of the single battle is decided, and the battle ends, the battle management table is updated. That is, on the basis of the data stored in the work area of the RAM 12 in Step S108, when an item is lost, its ID is erased from 'ACQUIRED ITEM' of the player character data storage unit 125.

In addition, a battle point P2 and an item holding point P3 for each brand are calculated (Step S132). The battle point P2 is a 1 point for each item held by the player character, and a 1 point whenever each item is used once. The item holding point P3 is a 1 point for each item held by the player character. Accordingly, by holding an item of the same brand or using the item several times, the battle point P2 of the corresponding brand can be increased.

Figure 14:
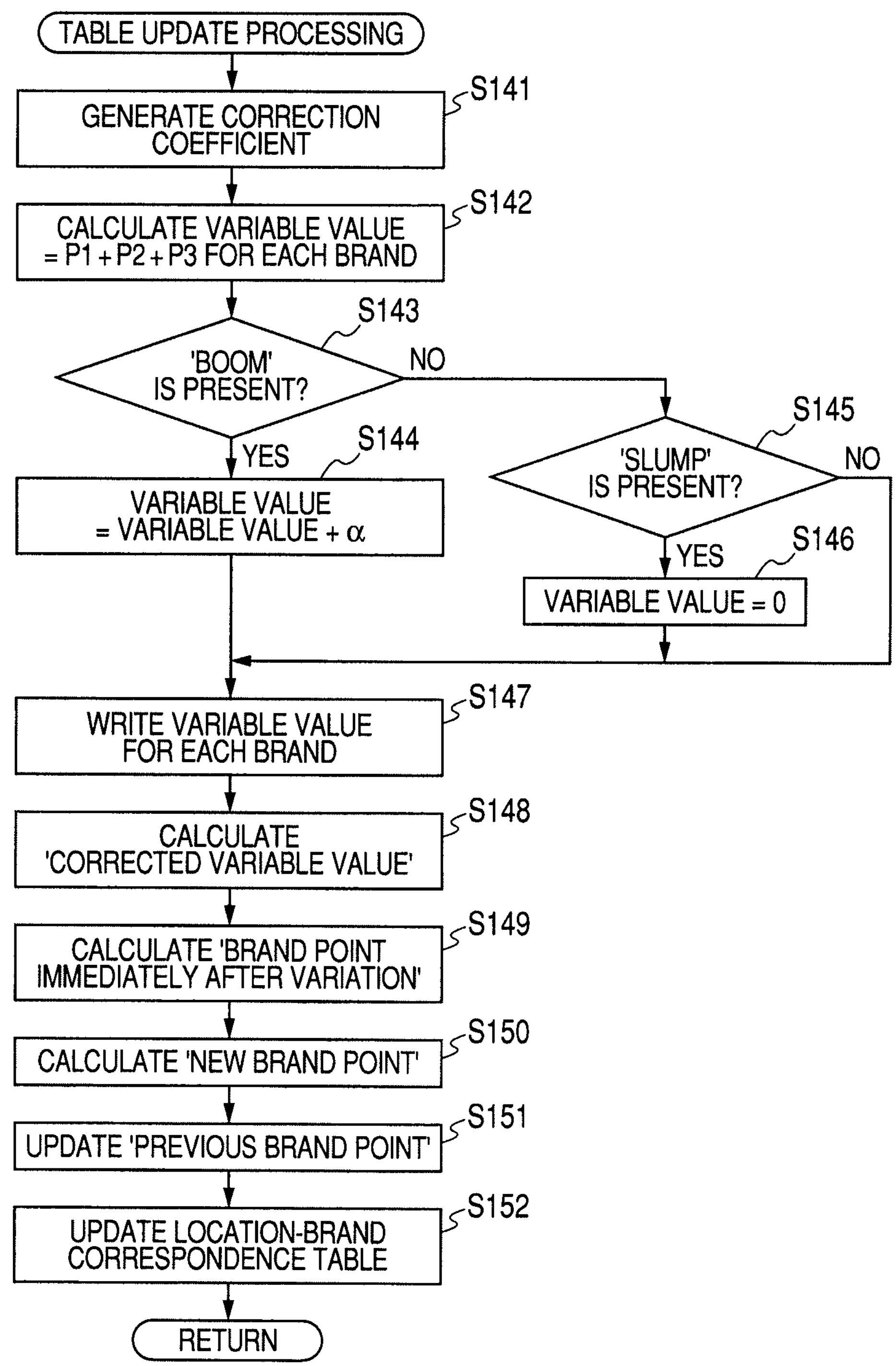
FIG. 14 is a flowchart showing the details of a table update processing.

FIG. 14 is a flowchart showing the details of a table update processing (Step S19). First, a correction coefficient is generated, and is written into an area data table of a selected area among the area data tables 126-1 to 126-23 shown in FIG. 6 as 'ADDITION VALUE CORRECTION COEFFICIENT' (Step S141).

As described above, the group of area data tables 126 is provided with the area data tables 126-1 to 126-23 shown in FIG. 6 in correspondence with the first to 23-th areas. Here, it is assumed that an area, which is selected by the player and in which the player character executes a battle against the enemy character, is the first area, the area data table shown in FIG. 6 is the area data table 126-1 of the first area, and the generated correction coefficient is '0.50'. Then, as shown in FIG. 6, '0.50' is written as 'ADDITION VALUE CORRECTION COEFFICIENT'.

Next, the variable value for each brand is calculated (Step S142). The variable value is calculated by the transaction point P1 for each brand calculated in Step S111 of FIG. 12, and the battle point P2 and the item holding point P3 for each brand calculated in Step S132 of FIG. 13. Specifically, the variable value is calculated as 'VARIABLE VALUE=P1+P2+P3' for each brand.

Subsequently, on the basis of an actual game time from the control unit 11, referring to the boom/slump table 130 shown in FIG. 10, it is determined whether or not a brand, which is turned into 'BOOM' at the actual game time, exists (Step S143). If a brand, which is turned into 'BOOM', exists, a predetermined value $\alpha$ is added to the variable value calculated in Step S142, and the obtained value is set as the variable value of the brand in that area (Step S144).

If no brand, which is turned into 'BOOM', exists, it is determined whether or not a brand, which is turned into 'SLUMP', exists (Step S145). If a brand, which is turned into 'SLUMP', exists, the variable value calculated in Step S142 is set to '0', and '0' is set as the variable value of the brand in that area (Step S146).

In regard to a brand, which is turned into neither 'BOOM' nor 'SLUMP', Steps S144 and S146 are not performed, and thus 'P1+P2+P3' calculated in Step S142 becomes the variable value as it is.

Through Steps S142 to S146, the variable value of each of the 13 brands in the selected area is decided (of course, a brand having a variable value '0' is also included). Next, the variable values for each brand are overwritten into the column 'VARIABLE VALUE' of the area data table 126-1 shown in FIG. 6 (Step S147).

Subsequently, 'CORRECTED VARIABLE VALUE' is calculated (Step S148). As described above, 'CORRECTED VARIABLE VALUE' is a value, which is obtained by 'VARIABLE VALUE'×'ADDITION VALUE CORRECTION COEFFICIENT'. For example, in case of 'RAT', since 'VARIABLE VALUE' is '10.00', and 'ADDITION VALUE CORRECTION COEFFICIENT' is '0.5', '10.00×0.5=5.00', that is, 'CORRECTED VARIABLE VALUE' becomes '5.00'. In addition, 'BRAND POINT IMMEDIATELY AFTER VARIATION' is calculated (Step S149). As described above, 'BRAND POINT IMMEDIATELY AFTER VARIATION' is a value, which is obtained by adding 'CORRECTED VARIABLE VALUE' to 'PREVIOUS BRAND POINT', and is calculated in '%'. For example, in case of 'RAT', since 'PREVIOUS BRAND POINT' is '2.00%', and 'CORRECTED VARIABLE VALUE' is '5.00', '2.00+5.00=7.00%', that is, 'BRAND POINT IMMEDIATELY AFTER VARIATION' becomes '7.00%'.

Next, 'NEW BRAND POINT' is calculated (Step S150). That is, the sum value of 'BRAND POINT IMMEDIATELY AFTER VARIATION' for the 13 brands exceeds 100%, and as shown in the drawing, becomes '157.50%'. Then, a value, which is obtained by rounding 'BRAND POINT IMMEDIATELY AFTER VARIATION' to 100%, is set as 'NEW BRAND POINT'.

Furthermore, 'PREVIOUS BRAND POINT' is updated (Step S151). That is, the brand point for each brand in the column 'NEW BRAND POINT' is copied and overwritten into the column 'PREVIOUS BRAND POINT'. In the state shown in FIG. 6, the brand 'CAT' having the previous brand point '14%' is 'BEST 1' and the brand 'BOAR' having the previous brand point '13%' is 'BEST 2'. In addition, the brand 'TIGER' having the previous brand point '3%' is 'WORST 2, and the brand 'RAT' having the previous brand point '2%' is 'WORST 1'. In contrast, if the brand point for each brand in the column 'NEW BRAND POINT' is overwritten into the column 'PREVIOUS BRAND POINT', the brand 'SHEEP' having the previous brand point '20.95%' becomes 'BEST 1', and the brand 'BOAR' having the previous brand point '9.84%' becomes 'BEST 2. In addition, the brands 'RAT' and 'SNAKE' having the previous brand point '4.44%' become 'WORST 2', and the brand 'DRAGON' having the previous brand point '3.81%' becomes 'WORST 1'.

By executing the battle processing shown in FIG. 13 on the basis of 'BEST 1', 'BEST 2', 'WORST 2', and 'WORST 1', even if a battle is developed again in the same area, since the power of the item becomes higher or lower than the reference power, or becomes unavailable, a battle against the enemy character is not developed just as the player expected. Therefore, the player can get stimulation from the battle or game development.

In this embodiment, the rankings of 'BEST 1', 'BEST 2', 'WORST 2', and 'WORST 1' are determined on the basis of the data stored in the area data tables 126-1 to 126-23 corresponding to the first to 23-th areas shown in FIG. 6. Alternatively, the rankings of 'BEST 1', 'BEST 2', 'WORST 2', and 'WORST 1' may be determined on the basis of the data stored in the location-brand correspondence table 128 shown in FIG. 8. In this case, since an influence of the correction coefficient is not present, the rankings can be determined in real reflection of the use frequency of the item by the player character.

In the embodiment, the video game apparatus main body 10 and the display device 50 are provided separately from each other. Alternatively, the display device 50 may be integrated into the video game apparatus main body 10. In addition, the display device 50 may further include many other image display units, in addition to the upper and lower image display units 51 and 52. Furthermore, the display device 50 may be constituted from a single image display unit, which is divided into a plurality of display regions, so as to achieve the same effects.

Although, in the embodiment, the video game apparatus 100 is illustrated, the invention can be applied to various apparatuses, including a personal computer, a mobile phone, a portable game machine, and the like, insofar as they have an image generation function. Moreover, when the invention is applied to the portable game machine, a compact storage medium such as a semiconductor memory card may be used as the storage medium 70, instead of CD-ROM or DVD-ROM.

In the embodiment, game data (various kinds of data such as control programs which are used in the game) for executing the above-described various processing in the video game apparatus main body 10 is stored in the storage medium 70. Alternatively, the game data may be distributed by a server apparatus such as the WWW server. In this case, the video game apparatus main body 10 may acquire the game data, which is distributed by the server apparatus, through the communication network 80, store the acquired game data in the HDD 13, and load the game data from the HDD 13 onto the RAM 12 for use.

What is claimed is:

1. A video game apparatus comprising:

a memory device configured to store a point manager which stores a plurality of items, each item associated with a brand of a plurality of brands, and a variable power value, each of the plurality of brands having an associated brand point;

at least one input device configured to receive input operations; and one or more processors configured to:

execute a virtual battle between a player character and an enemy character according to a first input operation of the at least one input device that allows the player character to use one or more of the plurality of items, wherein an outcome of the virtual battle is affected by the power value of the one or more items used;

determine an adjustment of the plurality of brand points in response to a use of one or more of the plurality of items by the player character based upon how often the one or more of the plurality of items is used by the player, by updating the brand point of the brand associated with the used item;

determine a ranking of each of the plurality of brands according to the brand point stored for each of the plurality of brands in the point manager; and change the power value of the plurality of items in accordance with the ranking of the brand, such that the items associated with a higher ranking brand has a greater power value.

2. The video game apparatus according to claim 1, wherein the use of the one of the plurality of items by the player character comprises an item equipment state of the player character and a use state when the player character uses the one of the plurality of items in the virtual battle against the enemy character.

3. The video game apparatus according to claim 2, wherein the use of the one of the plurality of items by the player character further comprises a virtual transaction of the one of the plurality of items in the game.

4. The video game apparatus according to claim 1, wherein the point manager stores the brand point for each of the plurality of brands as a percentage with respect to all of the plurality of brands, and the ranking determiner determines the ranking of each of the plurality of brands on the basis of the percentage of the brand point.

5. The video game apparatus according to claim 1, wherein the point manager includes:

a correction coefficient generator that generates a correction coefficient; and a corrector that corrects the point value according to which the brand point is updated on the basis of the correction coefficient generated by the correction coefficient generator.

6. The video game apparatus according to claim 4, wherein the correction coefficient generator randomly changes the correction coefficient.

7. The video game apparatus according to claim 1, wherein each of the plurality of items is assigned to a price to be used at a time of a virtual transaction, and the video game apparatus further includes a price value controller that changes the price of the plurality of items to which each brand of the plurality of brands is assigned according to the ranking of each of the plurality of brands.

8. The video game apparatus according to claim 1, further comprising:

a background drawer that draws a background on a screen where the player character is present, wherein the background drawer changes the background according to the ranking of each of the plurality of brands.

9. The video game apparatus according to claim 1, wherein at least a pair of the plurality of brands are in an opposite relationship, and the processor further corrects a first brand point of one of the pair in an opposite relationship by a correction value higher than a second brand point of an other of the pair.

10. The video game apparatus according to claim 1, further comprising:

a transceiver that transmits the brand point of each of the plurality of brands stored in the point manager to the outside, and simultaneously receives a second brand point of each of the plurality of brands from the outside, and wherein the processor changes the brand point of each of the plurality of brands stored in the point manager on the basis of the second brand point of each of the plurality of brands received by the transceiver.

11. A video game processing program tangibly embodied on a non-transitory computer-readable medium and executable by a computer provided in a video game apparatus, the video game processing program causing the computer to function as:

a point manager that stores, in a memory of the computer, a plurality of items, each item associated with a brand of a plurality of brands, and a variable power value, each of the plurality of brands, each having an associated brand point;

a battle manager, which executes a virtual battle between a player character and an enemy character according to an input operation that allows the player character to use one or more of the plurality of items, wherein an outcome of the battle is affected by the power value of the one or more items used;

the point manager further determines an adjustment of the plurality of brand points in response to a use of one or more of the plurality of items by the player character based upon how often the one or more of the plurality of items is used by the player, by updating the brand point of the brand associated with the used item;

a ranking determiner that determines, with a processor of the computer, a ranking of each of the plurality of brands according to the brand point stored for each of the plurality of brands by the point manager; and a power value controller that changes, with the processor of the computer, the power value of the plurality of items in accordance with the ranking of the brand, such that the items associated with a higher ranking brand has a greater power value.

12. A non-transitory computer-readable medium that is mounted in a video game apparatus and includes a video game processing program comprising:

a point manager that stores, in a memory of the computer, a plurality of items, each item associated with a brand of a plurality of brands, and a variable power value, each of the plurality of brands, each having an associated brand point;

a battle manager, which executes a virtual battle between a player character and an enemy character according to an input operation that allows the player character to use one or more of the plurality of items, wherein an outcome of the battle is affected by the power value of the one or more items used;

the point manager further determines an adjustment of the plurality of brand points in response to a use of one or more of the plurality of items by the player character based upon how often the one or more of the plurality of items is used by the player, by updating the brand point of the brand associated with the used item;

a ranking determiner that determines, with a processor of the computer, a ranking of each of the plurality of brands according to the brand point stored for each of the plurality of brands by the point manager; and a power value controller that changes, with the processor of the computer, the power value of the plurality of items in accordance with the ranking of the brand, such that the items associated with a higher ranking brand has a greater power value.

13. A video game processing method for execution by a video game apparatus, the video game apparatus executing a virtual battle between a player character and an enemy character according to an input operation that allows the player character to use one of the plurality of items that each have a variable power value, the method comprising:

storing, in a memory, a plurality of items, each item associated with a brand of a plurality of brands, and a variable power value, each of the plurality of brands, each having an associated brand point;

executing a virtual battle between a player character and an enemy character according to an input operation that allows the player character to use one or more of the plurality of items, wherein an outcome of the virtual battle is affected by the power value of the one or more items used;

determining an adjustment of the plurality of brand points in response to a use of one or more of the plurality of items by the player character based upon how often the one or more of the plurality of items is used by the player, by updating the brand point of the brand associated with the used item;

determining, with a processor, a ranking of each of the plurality of brands according to the brand point stored for each of the plurality of brands in the memory; and changing, with the processor the power value of the plurality of items in accordance with the ranking of the brand, such that the items associated with a higher ranking brand has a greater power value.

* * * * *